US006687383B1

(12) United States Patent
Kanevsky et al.

(10) Patent No.: US 6,687,383 B1
(45) Date of Patent: Feb. 3, 2004

(54) SYSTEM AND METHOD FOR CODING AUDIO INFORMATION IN IMAGES

(75) Inventors: Dimitri Kanevsky, Ossining, NY (US); Stephane Maes, Danbury, CT (US); Clifford A. Pickover, Yorktown Heights, NY (US); Alexander Zlatsin, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/436,163

(22) Filed: Nov. 9, 1999

(51) Int. Cl.[7] .................................................. G06K 9/00
(52) U.S. Cl. ........................ 382/100; 713/176; 380/210
(58) Field of Search ................................ 382/100, 232, 382/240; 380/51, 54, 210, 252, 287, 59, 73.1, 201, 205; 713/176, 179; 348/460, 461, 463; 709/217

(56) References Cited

U.S. PATENT DOCUMENTS 5,530,759 A * 6/1996 Braudaway et al. .......... 380/54
6,209,094 B1 * 3/2001 Levine et al. ............... 713/176
6,353,672 B1 * 3/2002 Rhoads ........................ 382/100
6,363,159 B1 * 3/2002 Rhoads ........................ 382/100
6,442,283 B1 * 8/2002 Tewfil et al. ............... 382/100
6,535,617 B1 * 3/2003 Hannigan et al. ........... 382/100

OTHER PUBLICATIONS

"Safeguarding Your Image", by Eric J. Lerner, Brainstorm—Deep Computing can predict what people will buy, create the ideal schedule, design better drugs—and even tell you when to open your umbrella, pp. 27–28.

"An Overview of Speaker Recognition Technology", by Sadaoki Furui, Automatic Speech and Speaker Recognition, Kluwer Academic Publishers, pp. 31–36.

* cited by examiner

*Primary Examiner*—Jayanti K. Patel
*Assistant Examiner*—Abolfazl Tabatabai
(74) *Attorney, Agent, or Firm*—Scully, Scott, Murphy & Presser; Daniel P. Morris, Esq.

(57) ABSTRACT

A system and method for encoding sound information in image sub-feature sets comprising pixels in a picture or video image. Small differences in intensity of pixels in this image set are not detectable by eyes, but are detectable by scanning devices that measure these intensity differences between closely situated pixels in the sub-feature sets. These encoded numbers are mapped into sound representations allowing for the reproduction of sound.

30 Claims, 3 Drawing Sheets

SYSTEM AND METHOD FOR CODING AUDIO INFORMATION IN IMAGES

BACKGROUND OF THE INVENTION

1. Field of the Invention

The present invention relates generally to systems and methods for embedding audio information in pictures and video images.

2. Discussion of the Prior Art

Generally, in books, magazines, and other media that include still or picture images, there is no audio or sound that accompanies the still (picture) images. In the case of a picture of a seascape, for example, it would be desirable to provide for the viewer the accompaniment of sounds such as wind and ocean waves. Likewise, for a video image, there may be audio information embedded in a separate audio track for simultaneous playback, however, the video content itself does not contain any embedded sound information that can be played back while the image is shown.

It would be highly desirable to provide a sound encoding system and method that enables the embedding of audio information directly within a picture or video image itself, and enables the playback or audio presentation of the embedded audio information associated with the viewed picture or video image.

SUMMARY OF THE INVENTION

The present invention relates to a system and method for encoding sound information in pixel units of a picture or image, and particularly the pixel intensity. Small differences in pixel intensities are typically not detectable by the eye, however, can be detected by scanning devices that measure the intensity differences between closely located pixels in an image, which differences are used to generate encoded numbers which are mapped into sound representations (e.g., cepstra) that are capable of forming audio or sound.

According to a first embodiment, one can measure digital pixel values in numbers of intensity that follows after some decimal point. For example, a pixel intensity may be represented digitally (in bytes/bits) as a number, e.g., 2.3567, with the first two numbers representing intensity capable of being detected by a human eye. Remaining decimal numbers however, are very small and may be used to represent encoded sound/audio information. As an example of such an audio encoding technique, for a 256 color (or gray scale) display, there are 8 bits per pixel. Current high-end graphic display systems utilize 24 bits per pixel: e.g., 8 bits for red, 8 bits for green, and 8 bits for blue; resulting in 256 shades of red, green and blue which may be blended to form a continuum of colors. According to the invention, if 8 bits per pixel quality is acceptable, then using a 24 bits per pixel graphics system, there remains 16 bits left for which audio data may be represented. Thus, for an 1000×1000 image there may be 16 Kbits for sound effects which amount is sufficient to represent short phrases or sound effects (assuming a standard representation of a speech waveform requires 8 Kbits/sec).

According to a second embodiment, audio information may be encoded in special pixels located in the picture or image, for example, at predetermined coordinates. These special pixels may have encoded sound information that may be detected by a scanner, however, are located at special coordinates in the image in a manner such that the overall viewing of the image is not affected.

In accordance with these embodiments, a scanning system is employed which enables a user to scan through the picture, for instance, with a scanning device which sends the pixel encoded sound information to a server system (via wireless connection, for example). The server system may include devices for reading the pixel encoded data and converting the converted data into audio (e.g., music, speech etc.) for playback and presentation through a playback device.

The pixel encoded sound information may additionally include "meta information" provided in a file format such as Speech Mark-up language (Speech ML) for use with a Conversational Browser.

Advantageously, the encoded information embedded in a picture may include device-control codes which may be scanned and retrieved form controlling a device.

BRIEF DESCRIPTION OF THE DRAWINGS

Further features, aspects and advantages of the apparatus and methods of the present invention will become better understood with regard to the following description, appended claims, and accompanying drawings where:

DETAILED DESCRIPTION OF THE PREFERRED EMBODIMENT

Figure 1:
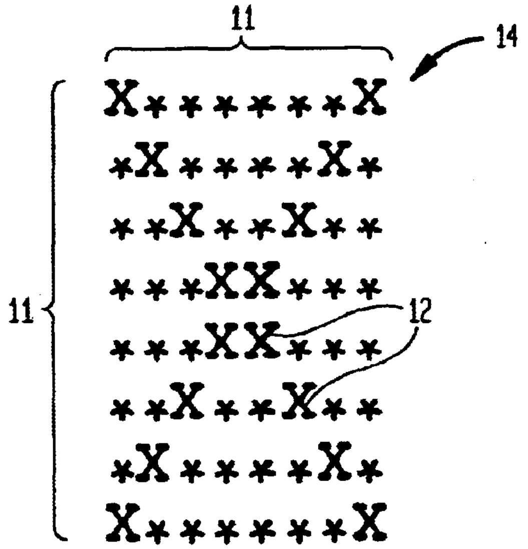
FIGS. 1 illustrates implementation of a dither pattern 10 that may be used to construct color and half tone images on paper or computer displays which may include sound information.

According to a first aspect of the invention, there is provided a system for encoding audio information in pixels comprising a visual image, such as a video image or a still image, such as may be found in a picture in a book, etc. For example, as shown in FIG. 1, a dither pattern 11 that may be used to construct color and half tone images on paper or computer displays and used to create intensity and color, may additionally be used to encode digital audio and other information such as commands for devices, robots, etc. Specifically, FIG. 1 illustrates a dither pattern 14 comprising an 8×8 array of pixels 11 which specifies 64 intensity levels. According to the invention, N dots (smallest divisible units in the pattern), represented by X's 12 in FIG. 1, may be sacrificed to encode audio information without significantly distorting the visual image. That is, the X's may be arranged in such a way as to minimize distortion as may be perceived by a viewer. According to the preferred embodiment of the invention, such a system for encoding audio information in a pixel unit implements currently available digital watermarking techniques such as described in commonly-assigned issued U.S. Pat. No. 5,530,759 entitled COLOR CORRECT DIGITAL WATERMARKING OF IMAGES, the whole content and disclosure of which is incorporated by reference as if fully set forth herein, and, in the reference authored by Eric J. Lerner entitled "Safeguarding Your Image", IBM Think Research, Vol. 2, pages 27–28, (1999), additionally incorporated by reference herein.

Figure 2A:
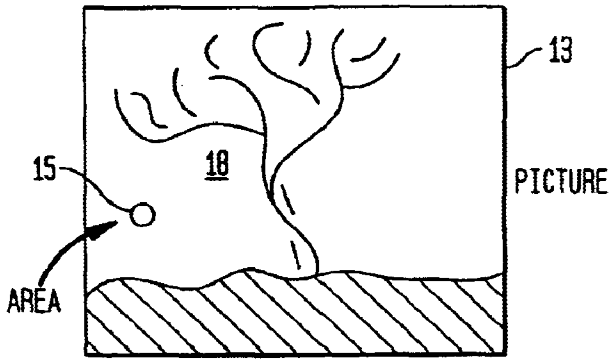
FIGS. 2(*a*)–2(*b*) illustrate a pixel 14 which may be located in a background 18 of a picture 13, and which may include image and audio information according to the invention.
Figure 2B:
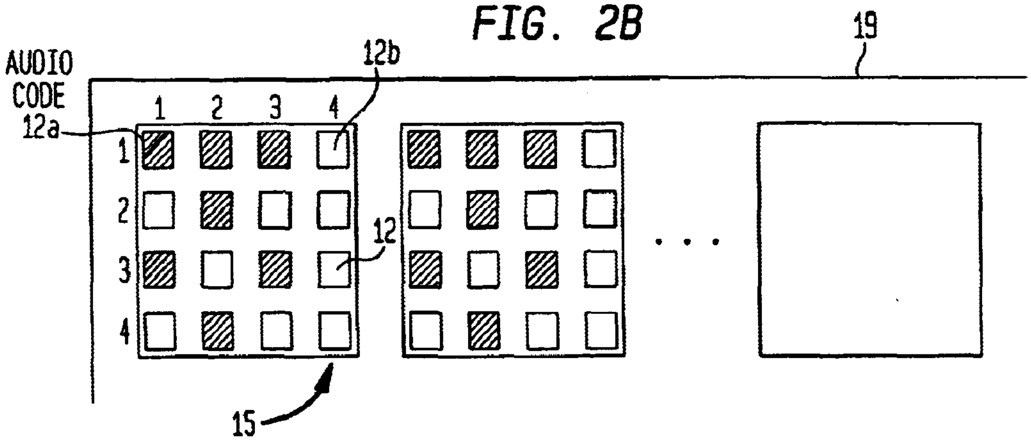

For purposes of description, as referred to herein, a video or still image forming a display comprise elemental "pixels" and areas therein are "blocks" or "components". Pixels are represented as digital information, i.e., units of computer memory or CPU memory, e.g., bytes or bits, as are blocks and components. Analogously, for purposes of discussion, a picture or image in a book comprises elemental units "dots" with sub-features or "areas" therein also referred to as blocks. As an example, FIGS. 2(*a*) and 2(*b*) illustrate an area or block of pixels 15 which may be located in a background 18 of a video image or picture 13, for example. As shown in FIG. 2(*a*), pixels 12*a*, 12*b*, are provided with both audio information (e.g., pixel 12*a*), and whole image information (e.g., pixel 12*b*). A pixel may range between 8 to 24 bits, for example, with each byte representing a color or intensity of a color on an image. As shown in FIG. 2(*b*), each block 15 may be located at a certain area on a medium 19, such as paper (e.g., in a book, or picture), or a digital space connected to a memory and CPU (e.g., associated with a video image, web-page display etc.), and each pixel (or dot) 15 being a sub-area in that block. A block 15 may additionally comprise a digital space located in an area provided in electronic paper, such as shown and described in U.S. patent application Ser. No. 5,808,783. It is understood that each block 15 may be square shaped, triangular, circular, polygonal, or oval, etc. In further view of FIG. 2(*b*), it is understood that all areas or "blocks" within an image may be represented as a matrix (of pixels or dots) enumerated as follows:

(1,1) (1,2) (1,3).
(2,1) (2,2)
(3,1)
(4,1)

Figure 3:
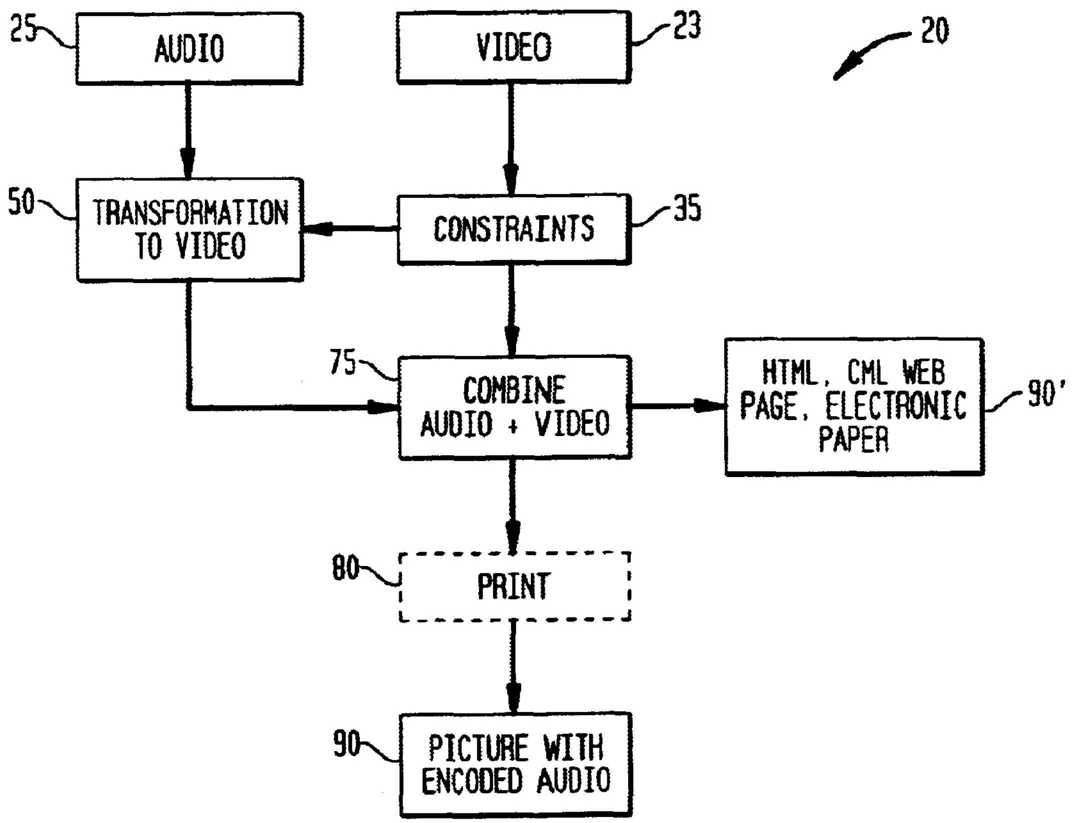
FIG. 3 illustrates a general block diagram depicting the system for encoding sound information in a picture.

FIG. 3 depicts generally, a system 20 that may be used to encode audio information into video or image pixels. As shown in FIG. 3, whole image video data input from video source 23 and audio data input from audio source 25 is input to a transformation device such as an audio-to-video-transcoder 50 which enables the coding of audio data into the video image/data =in the manner as described in herein incorporated U.S. Pat. No. 5,530,759. Particularly, the whole-image input is represented as video features that are split into complementary first and second video sub-feature sets having different functionality as follows:

1) a function of the first set of video sub-features is to represent parts of the whole image content of the picture; and,
2) a function of the second set of video sub-features is to represent coded audio information in the following specific ways:
   i) by enumerating subsets of video sub-features in the second set to contain units of audio information; and ii) enumerating video sub-features in the second set to satisfy constraints 35 that are related to visibility of the whole image in the system, e.g., clarity, brightness and image resolution. More specifically, visibility constraints include, but are not limited to, the following: intensity of sub-features in the second set that are not detectable by the human eye; intensity of sub-features in the second set that are not detectable by a camera, video camera, or other image capturing systems, however, are detectable by a scanning system to be described herein, which may retrieve the embedded audio information; and, placement of sub-features being so sparse that they are not detectable by an eye, camera, video-camera or other image capturing systems, however, are detectable by the scanning system. For example, constraints 35 may be applied to specific areas in accordance with prioritization of visual image content, i.e., the relative importance of parts of a visual image. For example, the specific areas may correspond to shadows in an image, background area of an image, corners of an image, back sides of a paper where an image is displayed, frames, etc. It is understood that the second subset of video features may be marked by special labels to distinguish it from the first subset of video features.

In further view of FIG. 3, the audio-to-video transcoder 50 is capable of performing the following functions: transforming audio-data into video data; and, inserting the video-data as video sub-features into whole image video data in such a way that the constraints that are related to visibility of the whole image in the system are satisfied. This insertion step is represented by a device 75 which combines the audio and video image data as pixel data for representation in digital space, e.g. a web page 90', or, which may be printed as a "hard-copy" representation 90 having encoded audio by a high-quality printing device 80. According to the preferred embodiments of the invention, units of audio information may include, but are not limited to, one of the following: a) audio waveforms with certain duration; b) a sample of audio wave forms of certain size; c) Fourier transform of audio wave forms; and, d) cepstra, which are Fourier transforms of the logarithm of a speech power spectrum, e.g., used to separate vocal tract information from pitch excitation in voiced speech. It is understood that, such audio information may represent voice descriptions of the image content, e.g., title of the image, copyright and author information, URLs, and other kinds of information. Additionally, rather than coding audio information, codes for device control, descriptions of the image content, e.g., title of the image, copyright and author information, e.g., URLs, may be embedded in the video or pictures in the manner described.

With respect to the sub-features of the second set of video sub-features, corresponding bits (and bytes) may be enumerated in one of the following ways: For instance, as shown in FIG. 5(*a*), the first k pixels 30 in each block 15 may be used as a subset of video features having byte values representing audio information; as shown in FIG. 5(*b*), every second array of pixels 32*a,b*, etc. in each block 15 may be used as a subset of video features having byte values representing audio information; and, in FIG. 5(*c*), pixels that belong to a subset of video features are indices into a table of numbers 40 providing values for all bytes (bits) in the set of pixels for each block 15. For instance, as shown in FIG. 5(*c*), the pixel locations labeled 1, 20 and 24 include are indexed into table 40 to obtain the video subset features, i.e., bit/byte values which includes audio information.

Analogously, sub-areas (dots) in a picture may be enumerated to represent image sub-features in one of the following ways: For instance, a) first amount "k" of dots in each area may be used as a subset of features to represent audio information; b) every second array of dots in each area may used as a subset of video features to represent audio information; and, c) pre-determined dot locations that belong to a subset of video features are indices into a table of number values numerating all sub-areas in the set of sub-areas for each block. As mentioned, each area or sub-area may be may be square shaped, triangular, circular, polygonal, or oval, etc. When an area is square-shaped, it may be divided into smaller squares with the video sub-features being represented by the smaller squares lying in corners of the corresponding area square. Furthermore, each sub-area may be include corresponding pixel value having a color of the same intensity.

More specifically, a technique for embedding units of audio information in the second set of video-sub features may include the following: 1) mapping the second set video sub-features into indexes of units of audio information with the video sub-features being ordered in some pre-determined fashion; and, 2) the map from sub-features into indexes of units of audio information induce the predetermined order of units of audio information giving rise to a global audio information corresponding to the whole second subset. It is understood that the global audio information includes, but is not limited to, one of the following: music, speech phrases, noise, sounds (e.g., of animals, birds, the environment), songs, digital sounds, etc. The global audio information may also include one of the following: title of the audio image, a representative sound effect in the image, represent spoken phrases by persons, e.g., who may be depicted in the image, etc.

In accordance with this technique, video sub-features may be mapped into indexes by relating video-sub features to predetermined numbers; the order on sub-features inducing the order on numbers; constructing a sequence of new numbers based on sequences of ordered old integers, with the sequence of new numbers corresponding to indexes via the mapping table 40 (FIG. 5(*c*)). It is understood that new numbers related to video sub-features may be constructed by applying algebraic formulae to sequences of old numbers. Representative algebraic formulae include one of the following: the new number is equal to the old number; the new number is a difference of two predetermined old numbers; or, the new number is a weighted sum of one or more old numbers. For example, as shown in FIG. 5(*d*), when provided in a "black" area of a picture display, a pixel value $X_2$ (e.g., 256 bits) may represent the sum of whole image data $X_1$, e.g., 200 bits ("shadowblack"), and embedded audio information $Y_1$ thus, yielding a shadow black pixel of reduced intensity than the original pixel value (black). Likewise, embedded audio data $Y_2$ may comprise a difference between pixel value $X_4$ minus the whole image data content at that pixel $X_3$. It is understood that other schemes are possible.

Sub-features may additionally be related to numbers via one of the following: classifying sub-features according to a physical quantity representation (e.g., color, waveform, wavelength, frequency, thickness, etc.) and numerating these classes of sub-features; or, classifying sub-features according to a physical quantity representation with the numbers representing the intensity of the physical quantity. Intensity includes, but not limited to, one of the following: intensity of color, period of waveform, size of wavelength, size of thickens of a color substance, and, the intensity of a physical quantity that is measured according to some degree of precision.

Figure 4:
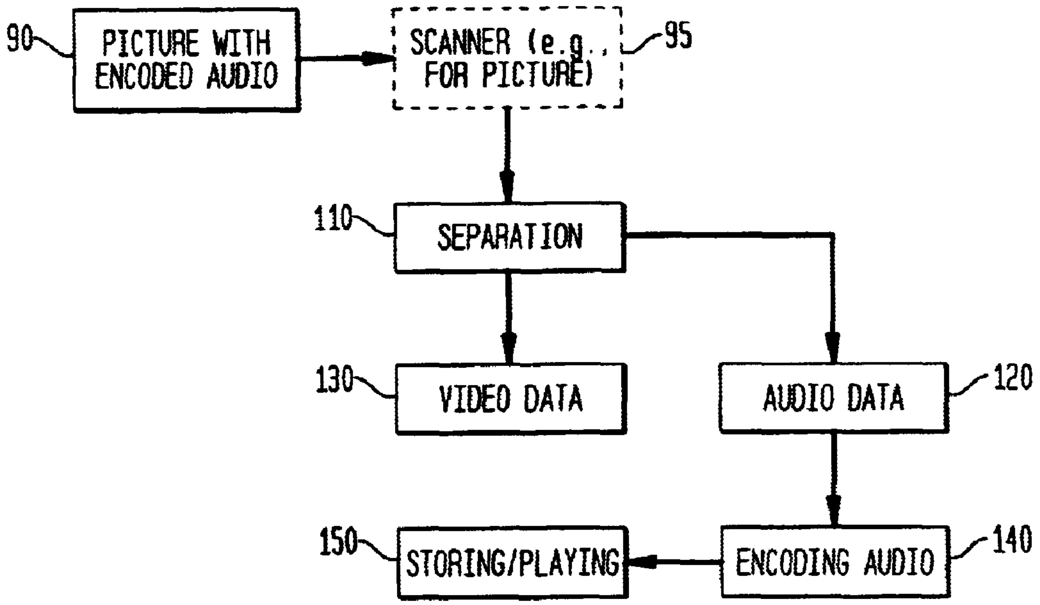
FIG. 4. is a detailed diagram depicting the method for playing sound information embedded in an image according to the present invention.
Figure 5A:
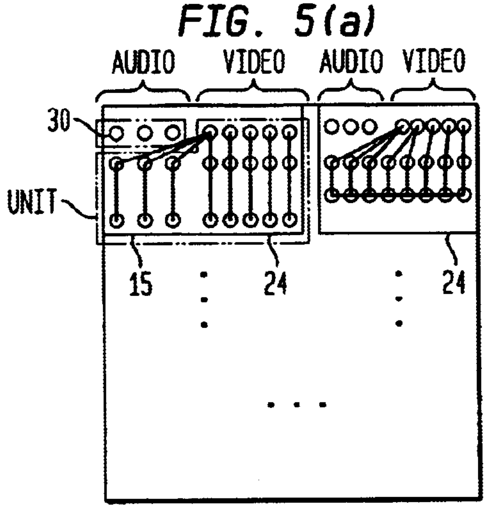
FIGS. 5(*a*)–5(*d*) depict in further detail methodologies for encoding audio information within pixel units.
Figure 5B:
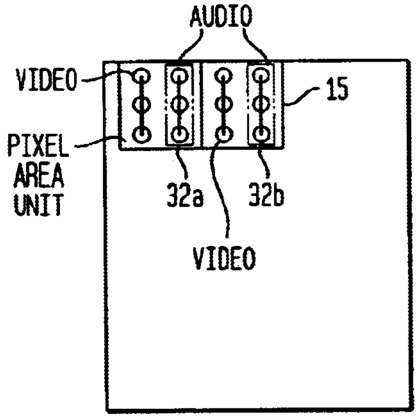
Figure 5C:
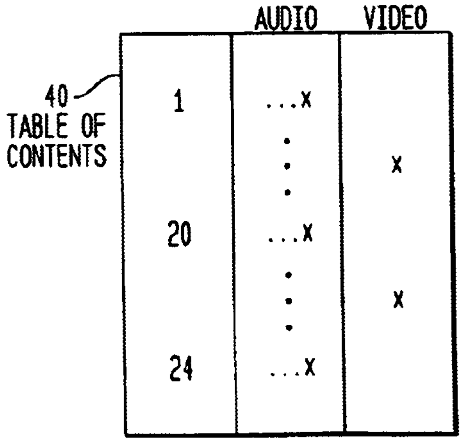
Figure 5D:
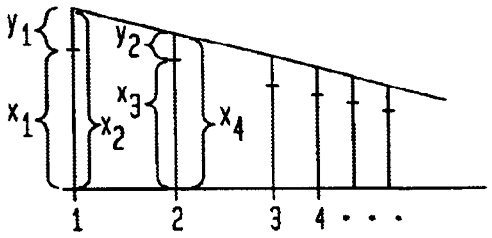

As shown in the block diagram of FIG. 4, according to a second aspect of the invention, there is provided a system 100 for decoding the audio information embedded in pixels 14 comprising the visual image, such as a video image, HTML or CML web page 90', or a still image 90 (FIG. 3). FIG. 4 thus depicts the audio and video playback functionality of system 100 which comprises a video-image or still-image input/output (I/O) processing devices, such as high-sensitivity scanner 95, having a CPU executing software capable of detecting the visual data of the image and extracting audio information that is stored in the video-sub features in the stored set. Input processing devices 95 may comprise one of the following: a scanner, a pen with scanning capabilities, web-browser, an audio-to-video transcoder device having processing transcoding capability such as provided through an image editor (e.g., Adobe Photoshop®), a camera, video-camera, microscope, binocular, telescope, while output processing devices may comprise one of the following: a printer, a pen, web-browser, video-to-audio transcoder, a speech synthesizer, a speaker, etc. Thus, for example, the second subset of video features comprises text which may be processed by a speech synthesizer.

Although not shown, it is understood that a CPU and corresponding memory are implemented in the system which may be located in one of the following: a PC, embedded devices, telephone, palmtop, and the like. Preferably, a pen scanner device may have a wireless connection to a PC (not shown) for transmitting scanned data for further processing.

The video and embedded audio information obtained from the scanner device 95 is input to a separator module 110, e.g., executing in a PC, and implementing routines for recognizing and extracting the audio data from the combined audio/video data. Particularly, the separator module 110 executes a program for performing operations to separate the complementary video sub-features into video and audio data so that further processing of the video and audio data may be carried out separately. It is understood that implementation of the scanner device 95 is optional and it is applicable when scanning images such as provided in books or pictures, and not necessary when the information is already in a digital form. It is additionally understood that the processing device 95 and separator module 110 may constitute a single device.

As further shown in FIG. 4, a separate process 120 performed on the audio data may include steps such as: a) finding areas of video data that include the video sub-features that contain coded audio data; b) interpreting the content of video sub-features in the video data as indexes to units of audio information; c) producing an order on the set of video sub-features (that represent audio information); d) inducing this order on the units of audio information; and e) processing units of audio information in the obtained order to produce the audio message.

Further, a separate simultaneous process 130 performed on video data may include steps such as: a) producing an order on the set of video-sub-features (that represent video information); b) inducing this order on the units of video information; and, c) processing units of video information in the obtained order to produce a video image.

In further view of FIG. 4, there is illustrated an encoding mechanism 140 to provide for the encoding of the retrieved audio data in a sound format, e.g., Real Audio (as *.RA files), capable of being played back by an appropriate audio playback device 150.

According to the invention as shown in FIG. 4, it is understood that audio information provided in web-pages having pictures may be further encoded in such a way that it is accessed by a conversational (speech) browser or downloadable via a speech browser instead of a GUI browser. For example, the automatic transcoder device 95 and separator 110 may further provide a functionality for converting an HTML document to Speech mark-up (ML) or Conversational mark-up (CML). That is, when transforming an HTML into speech CML, the image is decoded and the audio is shipped either as text (when it is a description, to be text-to-speech) (TTS) on the browser—at a low bit rate) or as an audio file for more complex sound effects.

Use of the conversational (speech) browser and conversational (speech) markup languages are described in commonly-owned, co-pending U.S. patent application Ser. No. 09/806,544, the contents and disclosure of which is incorporated by reference as if fully set forth herein, and, additionally, in systems described in commonly-owned, co-pending U.S. Provisional Patent Application Nos. 60/102,957 filed on Oct. 2, 1998 and 60/117,595 filed on Jan. 27, 1999, the contents and disclosure of each of which is incorporated by reference as if fully set forth herein.

Thus, the present invention may make use of a declarative language to build conversational user interface and dialogs (also multi-modal) that are rendered/presented by a conversational browser.

Further to this implementation, it is advantageous to provide rules and techniques to transcode (i.e., transform) legacy content (like HTML) into CML pages. In particular, it is possible to automatically perform transcoding for a speech only browser. However, information that is usually coded in other loaded procedures (e.g., applets, scripts, etc.) and images/videos, would likewise need to be handled. Thus, the invention additionally implements logical transcoding: i.e., transcoding of the dialog business logic, as discussed in commonly-owned, co-pending U.S. Patent Application Ser. No. 09/806,549 the contents and disclosure of which is incorporated by reference as if fully set forth herein; and, Functional transcoding: i.e., transcoding of the presentation. It also include conversational proxy functions where the presentation is adapted to the capabilities of the device (presentation capabilities and processing/engine capabilities).

In the context of the transcoding rules described in above-referenced U.S. Patent Application Ser. No. 09/806,544, the present invention prescribes replacing multi-media components (GUI, visual applets images and videos) by some meta-information: captions included as tags in the CML file or added by the context provider or the transcoder. However this explicitly requires the addition of this extra information to the HTML file with comment tags/caption that will be understood by the transcoder to produce the speech only CML page The concept of adding this information directly to the visual element enables automatic propagation of the information for presentation to the user when the images can not be displayed, especially without having the content provider adding extra tags in each of the files using this object. For example, there may be a description of direction, or description of a spreadsheet or a diagram. Tags of this meta-information (e.g., the caption) may also be encoded or a pointer to it (e.g., a URL), or a rule (XSL) on how to present it (in audio/speech browser or HTML with limited GUI capability) browsers. This is especially important when there is not enough space available in the object to encode the information.

Additionally, audio watermarking or pointer to "rules" may additionally be encoded for access to an image, for example, via a speech biometric such as described in commonly-owned issued U.S. Pat. No. 5,897,616 entitled "Apparatus and Methods for Speaker Verification/Identification/Classification employing Non-acoustic and/or Acoustic Models and Databases": by going to that address and obtaining the voiceprint and questions to ask. Upon verification of the user the image is displayed or presented via audio/speech.

Alternately, audio or audio/visual content may also be watermarked to contain information to provide GUI description of an audio presentation material. This enables replacement of a speech presentation material and still render it with a GUI only browser.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

Having thus described our invention, what we claim as new, and desire to secure by Letters Patent is:

1. A system for embedding audio information in image data corresponding to a whole image for display or print, said image data comprising pixels, the system comprising:

device for characterizing a sub-area in said whole image as a pixel block comprising a predetermined number of pixels, each pixel block including first and second complementary sets of pixels representing respective first and second image sub-feature sets, a first image sub-feature set including pixels comprising whole image content to be displayed or printed; and, a second image sub-feature including pixels comprising coded audio information; and, audio-video transcoding device for associating said second image sub-feature set with units of audio information, said transcoding being performed so that image sub-features in the second set satisfy constraints related to visibility of said whole image.

2. The system as claimed in claim 1, wherein said whole image corresponds to a digital space associated with a digital information presentation device including a memory storage and a CPU, each said pixel comprising a unit of computer memory and including predefined number of data bits.

3. The system as claimed in claim 2, wherein each said pixel value includes a first predefined number of data bytes of memory storage representing whole image content and a second predefined number of data bytes representing coded audio information, said second predefined number of data bytes being smaller than said first predefined number of data bytes.

4. The system as claimed in claim 3, wherein each byte of said first predefined number of data bytes of memory storage represents a color or intensity of a color of said image.

5. The system as in claim 2, wherein an amount of said second set of pixels having values comprising coded audio information in said pixel block is less than an amount of said first set of pixels in said pixel block.

6. The system as in claim 2, wherein pixel locations in a pixel block comprise indices into a table of values for said pixel, said table including pixel values corresponding to whole image content and audio information.

7. The system as claimed in claim 2, wherein said digital information presentation device includes electronic paper.

8. The system as claimed in claim 1, where each sub-area is characterized as having a shape according to one selected from shapes including: square, rectangle, triangle, circle, polygon, oval.

9. The system as claimed in claim 1, further comprising means for specifying constraints related to visibility of said whole image, said constraints specified in accordance with prioritization of visual image content.

10. The system as claimed in claim 9, wherein said transcoding device includes audio-to-video transcoder for transforming audio data into video data, and inserting said video data as video sub-features in the second set according to said constraints related to visibility of said whole image.

11. The system as claimed in claim 1, wherein said transcoding device for associating said second image sub-feature set with units of audio information further includes:

means for mapping video sub-features of said second image sub-feature set into indexes of units of audio information; said video sub-features being ordered in a predetermined fashion, wherein said mapping means induces an order of units of audio information for providing a global audio information content.

12. The system as claimed in claim 11, wherein said means for mapping video sub-features into indexes of units of audio information includes:

means for relating video-sub features to number values, an order of sub-features inducing an order of said number values;

means for constructing a sequence of new number values based on sequences of prior ordered number values; and, table means having entry indexes according to said sequence of new number values.

13. The system as claimed in claim 12, wherein said new number values are constructed applying algebraic formulae to sequences of prior number values.

14. The system as claimed in claim 12, wherein said means for relating video-sub features to number values comprises: means for classifying sub-features according to physical quantities represented by said sub-features, and assigning number values to said classes, said number values representing intensity of said classified physical quantity.

15. The system as claimed in claim 14, where physical quantities are one of the following: color, waveform type, wavelength, frequency, thickness.

16. The system as claimed in claim 1, further comprising: a video-image processing device for extracting said audio information that is embedded in said second image sub-feature set.

17. The system as claimed in claim 14, wherein said extracting means comprises:

means for determining said second image sub-feature set areas of said image comprising said coded audio data, said video sub-features in said second sub-feature set being ordered in a predetermined fashion;

means for determining content of video sub-features in video data as indexes to units of audio information and inducing an order on the units of audio information; and, means for processing units of audio information in the induced order to produce an audio message from an audio playback device.

18. The system as claimed in claim 16, wherein said audio information includes conversational mark-up language (CML) data accessible via a speech browser for playback therefrom.

19. A method for embedding audio information in image data corresponding to a whole image for display or print, said image data comprising pixels, the method steps comprising:

characterizing a sub-area in said whole image as a pixel block comprising a predetermined number of pixels, each pixel block including first and second complementary sets of pixels representing respective first and second image sub-feature sets, a first image sub-feature set including pixels comprising whole image content to be displayed or printed; and, a second image sub-feature including pixels comprising coded audio information; and, encoding pixels of said first image sub-feature set with whole image content to be displayed or printed and pixels of said second image sub-feature set with coded audio information, said encoding of said audio data performed such that image sub-features in the second set satisfy constraints related to visibility of said whole image.

20. The method as claimed in claim 19, wherein said whole image corresponds to a digital space associated with a digital information presentation device including a memory storage and a CPU, each said pixel comprising a unit of computer memory and including a predefined data bit value.

21. The method as claimed in claim 20, wherein pixel locations in a pixel block comprise indices into a table of values for said pixel, said table including pixel values corresponding to whole image content and audio information.

22. The method as claimed in claim 21, wherein said encoding step includes the step of: specifying constraints related to visibility of said whole image, said constraints specified in accordance with prioritization of visual image content.

23. The method as claimed in claim 22, wherein said encoding step includes the steps of:

transforming audio data into video data; and, inserting said video data as video sub-features in the second set according to said constraints related to visibility of said whole image.

24. The method as claimed in claim 22, wherein said encoding step includes the steps of:

mapping video sub-features of said second image sub-feature set into indexes of units of audio information, said video sub-features being ordered in a predetermined fashion; and, inducing an order of units of audio information for providing a global audio information content.

25. The method as claimed in claim 24, wherein said mapping of video sub-features into indexes of units of audio information includes:

relating video-sub features to number values, an order of sub-features inducing an order of said number values; and constructing a sequence of new number values based on sequences of prior ordered number values; and, entering said sequence of new number values as indexes to a table look-up device.

26. The method as claimed in claim 25, wherein said new number values are constructed according to algebraic formulae applied to sequences of prior number values.

27. The method as claimed in claim 25, wherein said relating step further comprises the steps of:

classifying sub-features according to physical quantities represented by said sub-features; and, assigning number values to said classes, said number values representing intensity of said classified physical quantity, wherein said classified physical quantities include one selected from the following: color, waveform type, wavelength, frequency, thickness.

28. The method as claimed in claim 19, further comprising steps of:

scanning an image having audio information embedded in said second image sub-feature set; and, extracting said embedded audio information via a playback device.

29. The method as claimed in claim 28, wherein said extracting step comprises:

determining said second image sub-feature set areas of said image comprising said coded audio data, said video sub-features in said second sub-feature set being ordered in a predetermined fashion;

determining content of video sub-features in video data as indexes to units of audio information and inducing an order on the units of audio information; and, processing said units of audio information in the induced order to produce an audio message.

30. A program storage device readable by a machine, tangibly embodying a program of instructions executable by the machine to perform method steps for embedding audio information in image data corresponding to a whole image for display or print, said image data comprising pixels, the method steps comprising:

dividing each of one or more image pixels into first and second complementary sets of pixel components representing respective first and second image sub-feature sets;

encoding pixels of said first image sub-feature set with whole image content to be displayed or printed and pixels of said second image sub-feature set with coded audio information, said encoding of said audio data performed such that image sub-features in the second set satisfy constraints related to visibility of said whole image.

* * * * *

UNITED STATES PATENT AND TRADEMARK OFFICE

CERTIFICATE OF CORRECTION

PATENT NO. : 6,687,383 B1
APPLICATION NO. : 09/436163
DATED : February 03, 2004
INVENTOR(S) : Kanevsky et al.

It is certified that error appears in the above-identified patent and that said Letters Patent is hereby corrected as shown below:

Column 9, Line 34, Claim 17:
"Claim 14" should read -- Claim 16 --

Signed and Sealed this

First Day of August, 2006

JON W. DUDAS
*Director of the United States Patent and Trademark Office*